US009653956B2

(12) United States Patent
Taniguchi et al.

(10) Patent No.: US 9,653,956 B2
(45) Date of Patent: May 16, 2017

(54) STATOR FOR ROTATIONAL ELECTRICAL MACHINE WITH U SHAPED CONDUCTOR SEGMENTS WITH BENT AND SLOPED END WINDING AT VARYING ANGLES AND DIMENSION

(71) Applicant: DENSO CORPORATION, Kariya, Aichi-pref. (JP)

(72) Inventors: Makoto Taniguchi, Obu (JP); Nobuyuki Kimura, Kitanagoya (JP); Masaru Watanabe, Okazaki (JP); Hideaki Kuri, Chiryu (JP)

(73) Assignee: DENSO CORPORATION, Kariya (JP)

( * ) Notice: Subject to any disclaimer, the term of this patent is extended or adjusted under 35 U.S.C. 154(b) by 185 days.

(21) Appl. No.: 14/457,308

(22) Filed: Aug. 12, 2014

(65) Prior Publication Data
US 2015/0054375 A1 Feb. 26, 2015

(30) Foreign Application Priority Data

Aug. 21, 2013 (JP) .................................. 2013-171046

(51) Int. Cl.
*H02K 3/12* (2006.01)
*H02K 3/28* (2006.01)
(Continued)

(52) U.S. Cl.
CPC ................. *H02K 3/28* (2013.01); *H02K 3/12* (2013.01); *H02K 3/18* (2013.01); *H02K 15/085* (2013.01); *H02K 2213/03* (2013.01)

(58) Field of Classification Search
CPC ............. H02K 3/00–3/52; H02K 15/00–15/16
(Continued)

(56) References Cited

U.S. PATENT DOCUMENTS 5,714,824 A * 2/1998 Couture ................... H02K 3/12
310/179
5,936,326 A 8/1999 Umeda et al.
(Continued)

FOREIGN PATENT DOCUMENTS

JP  55-155941   11/1980
JP  57-155941    9/1982
(Continued)

OTHER PUBLICATIONS

English Translation from JPO website of JP 2012-143065.*
(Continued)

*Primary Examiner* — Terrance Kenerly
*Assistant Examiner* — Maged Almawri
(74) *Attorney, Agent, or Firm* — Nixon & Vanderhye P.C.

(57) ABSTRACT

A stator for a rotational electrical machine includes a cylindrical stator core and a stator winding. The stator core includes slots arranged at intervals in a circumferential direction. The slots pass through the stator core in an axial direction. The stator winding is obtained by joining together ends of U-shaped conductors inserted through the slots. A second insertion part is located away from a first insertion part in the circumferential direction and is inserted in its corresponding slot. A joining end part is joined to another U-shaped conductor at a joining position away from the insertion part in the circumferential direction. The joining end part includes a first bent part and at least one second bent part. The first bent part is bent near an opening of its corresponding slot. The second bent part is bent between the first bent part and the joining position.

8 Claims, 6 Drawing Sheets (51) Int. Cl.
*H02K 15/085* (2006.01)
*H02K 3/18* (2006.01)

(58) Field of Classification Search
USPC .......... 310/201, 179, 208, 203, 202; 29/606, 29/605, 603.23–603.26
See application file for complete search history.

(56) References Cited

U.S. PATENT DOCUMENTS

| | | | |
|---|---|---|---|
| 5,955,804 A * | 9/1999 | Kusase | H02K 3/12 29/596 |
| 5,982,068 A | 11/1999 | Umeda et al. | |
| 5,986,375 A | 11/1999 | Umeda et al. | |
| 6,388,358 B1 * | 5/2002 | Umeda | H02K 3/12 310/179 |
| 8,772,996 B2 * | 7/2014 | Utaka | H02K 3/12 310/201 |
| 2001/0011852 A1 * | 8/2001 | Nakamura | H02K 3/34 310/215 |
| 2002/0011753 A1 * | 1/2002 | Asao | H02K 3/50 310/45 |
| 2005/0140239 A1 * | 6/2005 | Klamt | H02K 3/12 310/201 |
| 2006/0232157 A1 * | 10/2006 | Ooiwa | H02K 9/06 310/201 |
| 2012/0007462 A1 * | 1/2012 | Kouda | H02K 3/12 310/206 |
| 2013/0169102 A1 * | 7/2013 | Fukushige | H02K 3/12 310/198 |
| 2013/0181555 A1 * | 7/2013 | Okamura | H02K 3/12 310/59 |
| 2014/0070646 A1 * | 3/2014 | Isoda | H02K 3/325 310/71 |
| 2014/0111055 A1 * | 4/2014 | Chamberlin | H02K 3/12 310/208 |
| 2015/0015110 A1 * | 1/2015 | Kaimori | H02K 1/276 310/201 |

FOREIGN PATENT DOCUMENTS

| | | | | |
|---|---|---|---|---|
| JP | 57155941 | * | 9/1982 | ............... H02K 3/04 |
| JP | UM-S57-155941 | * | 9/1982 | |
| JP | 2006-67674 | | 3/2006 | |
| JP | 2012-143065 | * | 7/2012 | |
| JP | 2012143065 | * | 7/2012 | ............... H02K 3/12 |

OTHER PUBLICATIONS

English Translation from JPO website of Japanese Utility Patent Model No. JP-UM-S57-155941 Dated Sep. 30, 1982.*
EIC STIC 2800 Search Report # 518154 by Darryl French DAted Jul. 14, 2016.*
EIC2800 Search Report 518154 by Darryl French DAte Jul. 14, 2016.*
JP 2012143065 English Machine Translation.*
JP 57155941 English Translation.*
Office Action (4 pages) dated Jun. 30, 2015 issued in corresponding Japanese Application No. 2013-171046 and English translation (6 pages).

* cited by examiner

STATOR FOR ROTATIONAL ELECTRICAL MACHINE WITH U SHAPED CONDUCTOR SEGMENTS WITH BENT AND SLOPED END WINDING AT VARYING ANGLES AND DIMENSION

CROSS REFERENCE TO RELATED APPLICATION

This application is based on Japanese Patent Application No. 2013-171046 filed on Aug. 21, 2013, the disclosures of which are incorporated herein by reference.

TECHNICAL FIELD

The present disclosure relates to a stator of a rotational electrical machine.

BACKGROUND

There is known a stator winding obtained by inserting a U-shaped conductor through a slot of a stator core, by bending in a circumferential direction a projecting part of the U-shaped conductor that projects out of the stator core, and by joining an end of this projecting part to another U-shaped conductor. By use of a wiring material which is rectangular in cross-section for the U-shaped conductor, an occupying area rate (i.e., occupancy rate of a conductor sectional area to a slot sectional area) of such a stator winding can be increased. For example, in a stator described in JP-A-H11-346448, a U-shaped conductor is bent in a circumferential direction near an opening of a slot of a stator core to arrange its end at a position of joining to another U-shaped conductor.

How to make short an axial length of a part of a stator winding that sticks out of a stator core, i.e., axial length of a coil end is key in downsizing a stator in an axial direction. Accordingly, a bending angle of a U-shaped conductor near an opening of a slot of the stator core needs to be large. However, if the bending angle is too large, the U-shaped conductor is pressed on a slot edge of the stator core, so that a coating film of the U-shaped conductor, and an insulating member provided between the U-shaped conductor and the stator core may be damaged. For this reason, conventionally, the bending angle of the U-shaped conductor cannot be large.

As a measure against this, by increasing thicknesses of the coating film of the U-shaped conductor and the insulating member, the damages to the coating film of the U-shaped conductor and the insulating member by the slot edge of the stator core may be limited with the bending angle made large. Nevertheless, there is a disadvantage of reduction in the occupying area rate when the thicknesses of the coating film of the U-shaped conductor and the insulating member increase.

SUMMARY

The present disclosure addresses at least one of the above issues.

According to the present disclosure, there is provided a stator for a rotational electrical machine, including a stator core and a stator winding. The stator core is formed in a cylindrical shape and includes a plurality of slots arranged at intervals in a circumferential direction of the stator core. The plurality of slots pass through the stator core in an axial direction of the stator core. The stator winding is obtained by joining together ends of a plurality of U-shaped conductors inserted through the plurality of slots. Each of the plurality of U-shaped conductors includes a first insertion part, a second insertion part, a U-shaped part, a first joining end part, and a second joining end part. The first insertion part is inserted in a corresponding one of the plurality of slots. The second insertion part is located away from the first insertion part in the circumferential direction and is inserted in a corresponding one of the plurality of slots. The U-shaped part connects together one end of the first insertion part and one end of the second insertion part on one side of the stator core in the axial direction. The first joining end part extends out of the other end of the first insertion part on the other side of the stator core in the axial direction, and is joined to another U-shaped conductor at a joining position away from the first insertion part in the circumferential direction. The second joining end part extends out of the other end of the second insertion part on the other side of the stator core in the axial direction, and is joined to another U-shaped conductor at a joining position away from the second insertion part in the circumferential direction. The first joining end part and the second joining end part respectively include a first bent part and at least one second bent part. The first bent part is bent near an opening of a corresponding one of the plurality of slots. The at least one second bent part is bent between the first bent part and the joining position.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be described below in reference to the drawings. To indicate substantially the same configurations between the embodiments, the same reference numerals are used to omit their descriptions.

First Embodiment

Figure 1:
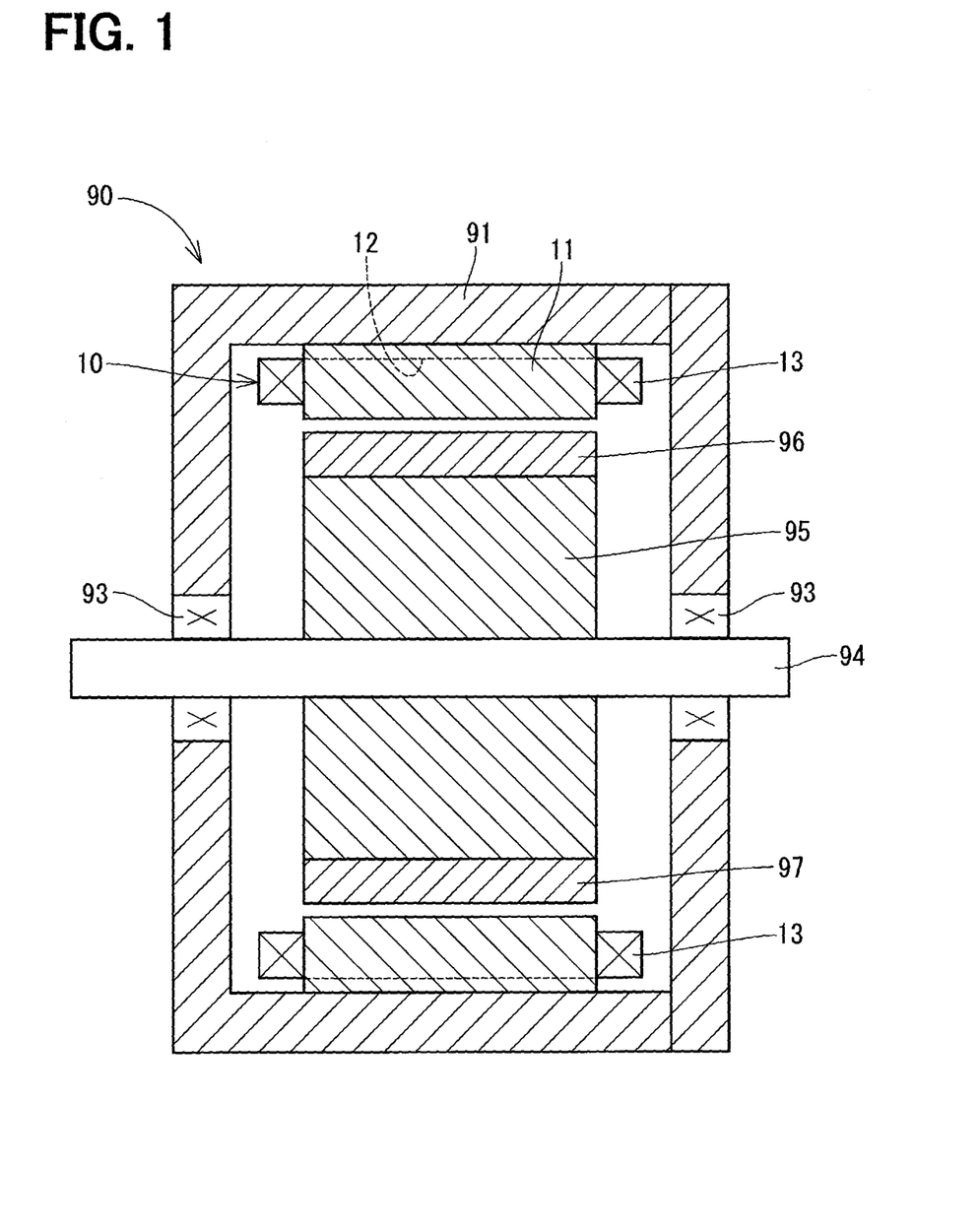
FIG. 1 is a sectional view illustrating a general configuration of a motor to which a stator is applied in accordance with a first embodiment.

A stator of a first embodiment is applied to a motor illustrated in FIG. 1. A motor 90 is a three phase brushless motor that is used as a power source of an electric power steering for a vehicle, and includes a housing 91, a rotator 92, and a stator 10.

The rotator 92 includes a rotatable shaft 94 that is supported rotatably by the housing 91 via a bearing 93, a rotor core 95 that is press-fitted around the rotatable shaft 94, and permanent magnets 96, 97 that are attached to the rotor core 95. The stator 10 includes a cylindrical stator core 11 that is fixed on an inner wall of the housing 91 radially outward of the rotator 92, and a stator winding 13 that is wound on the stator core 11.

Figure 2:
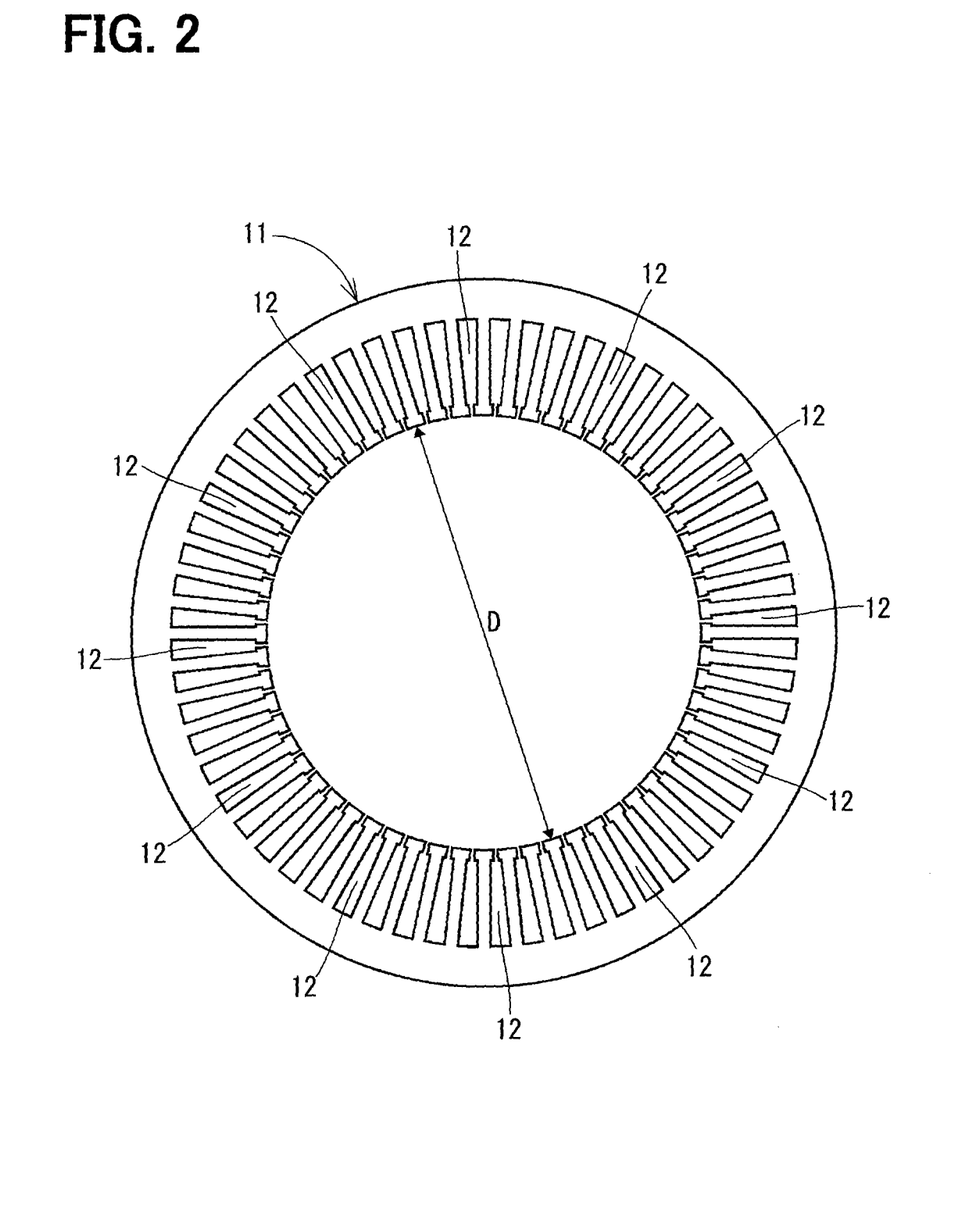
FIG. 2 is a diagram illustrating an iron core of the stator in FIG. 1 viewed from an axial direction.

The stator 10 will be described with reference to FIGS. 2 to 5. As illustrated in FIG. 2, the stator core 11 includes slots 12 passing through the core 11 at intervals in the circumferential direction. In the present embodiment, each slot 12 is formed to extend radially from an inner peripheral surface of the stator core 11.

Figure 3:
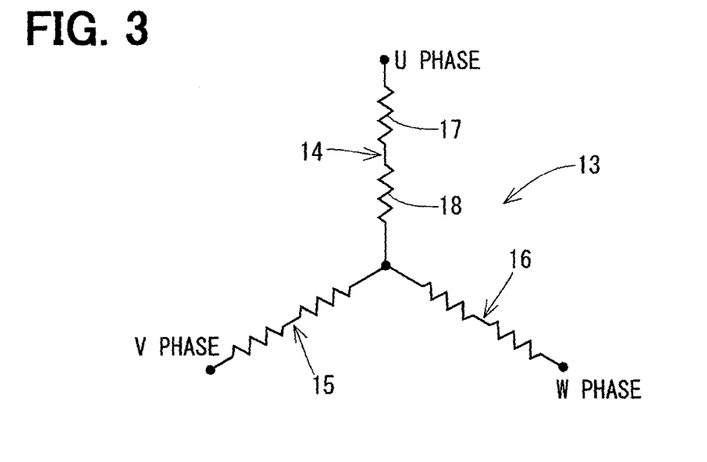
FIG. 3 is a connection diagram of winding wires that constitute a winding wire of the stator in FIG. 1.

As illustrated in FIG. 3, the stator winding 13 includes a U-phase winding 14, a V-phase winding 15, and a W-phase winding 16. In the present embodiment, a star connection is made between the U-phase winding 14, the V-phase winding 15, and the W-phase winding 16. The U-phase winding 14, the V-phase winding 15, and W-phase winding 16 will be hereinafter described as a "winding wire" when not distinguished from each other.

Figure 4:
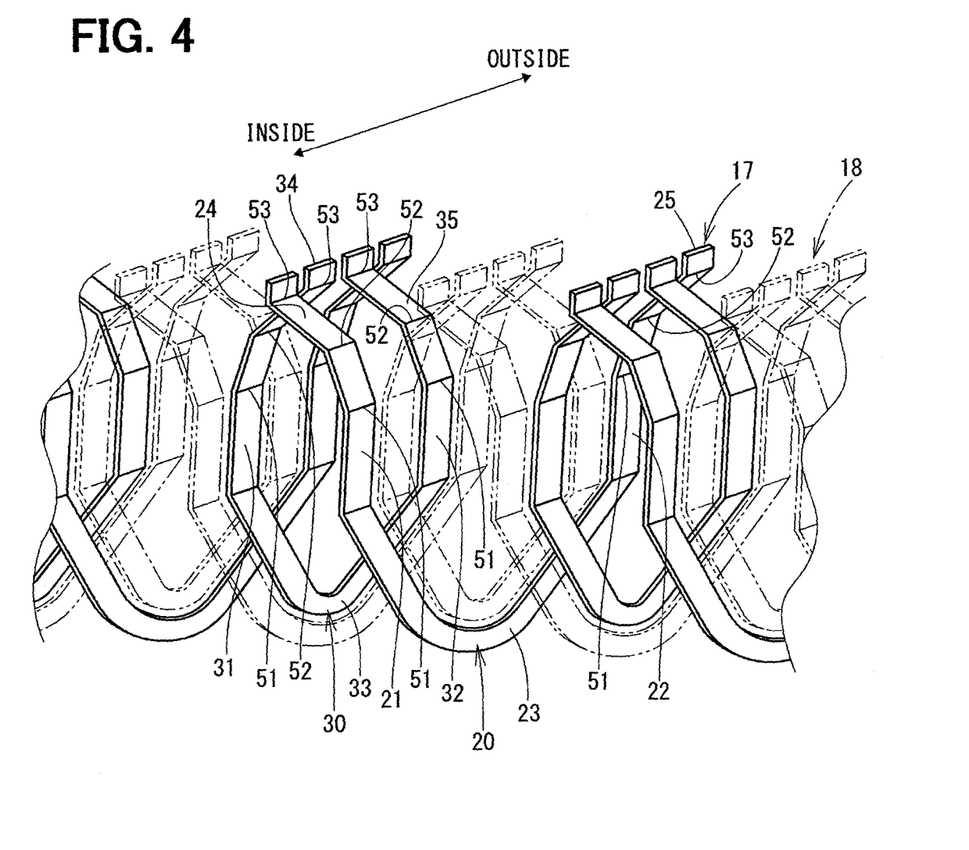
FIG. 4 is a perspective view illustrating a first winding wire part and a second winding wire part in FIG. 3.

As illustrated in FIG. 4, the winding wire includes a first winding wire part 17 and a second winding wire part 18. In the present embodiment, the number of slots for each magnetism and each phase is two. The first winding wire part 17 is wound two turns in a counterclockwise direction on the stator core 11, and the second winding wire part 18 is wound two turns in a clockwise direction on the stator core 11. The first winding wire part 17 and the second winding wire part 18 are connected in series. For convenience, in FIG. 4, there is illustrated only one turn of the first winding wire part 17 and the second winding wire part 18. The first winding wire part 17 is indicated by a continuous line, and the second winding wire part 18 is indicated by an alternate long and two short dashes line. When moving from the first turn to the second turn, the first winding wire part 17 and the second winding wire part 18 are inserted into the slots 12 that are shifted from each other respectively by one slot pitch. The first winding wire part 17 and the second winding wire part 18 will be hereinafter described as a "winding wire part" when not distinguished from each other.

As illustrated in FIG. 4, the winding wire part is formed such that a wave winding part and a lap winding part are continuously arranged alternately in the circumferential direction. The lap winding part of the second winding wire part 18 is located inward of the wave winding part of the first winding wire part 17, and the lap winding part of the first winding wire part 17 is located inward of the wave winding part of the second winding wire part 18. The above wave winding part includes an outer U-shaped conductor (first U-shaped conductor) 20, and the above lap winding part includes an inner U-shaped conductor (second U-shaped conductor) 30. The winding wire part is obtained by inserting the U-shaped conductors 20, 30 through the slot 12 of the stator core 11, by bending in the circumferential direction the projecting parts of these U-shaped conductors 20, 30 that project from the stator core 11, and by joining the ends of the projecting parts to another U-shaped conductor.

The outer U-shaped conductor 20 includes an outer first insertion part 21 and an outer second insertion part 22 that are inserted in the slots 12 (see FIG. 2) of the stator core 11, an outer U-shaped part 23 that connects together one end of the outer first insertion part 21 and one end of the outer second insertion part 22, an outer first joining end part 24 that extends in the circumferential direction from the other end of the outer first insertion part 21, and the outer second joining end part 25 that extends in the circumferential direction from the other end of the outer second insertion part 22. The outer second insertion part 22 is located away from the outer first insertion part 21 in the circumferential direction. In the present embodiment, the outer second insertion part 22 is inserted in the slot 12, which is six slots away from the slot 12 in which the outer first insertion part 21 is inserted.

The outer U-shaped part 23 is located on one side of the stator core 11 in the axial direction, and the outer first joining end part 24 and the outer second joining end part 25 are located on the other side of the stator core 11 in the axial direction. The outer first joining end part 24 and the outer second joining end part 25 are crooked to be away from each other. In the present embodiment, the outer first joining end part 24 is joined to the inner U-shaped conductor 30 at a position corresponding to the slot 12 which is three slots 12 away from the slot 12 in which the outer first insertion part 21 is inserted. The outer second joining end part 25 is joined to the inner U-shaped conductor 30 at a position corresponding to the slot 12 which is three slots 12 away from the slot 12 in which the outer second insertion part 22 is inserted.

The inner U-shaped conductor 30 includes an inner first insertion part 31 and an inner second insertion part 32 that are inserted in the slots 12 (see FIG. 2) of the stator core 11, an inner U-shaped part 33 that connects together one end of the inner first insertion part 31 and one end of the inner second insertion part 32, an inner first joining end part 34 that extends in the circumferential direction from the other end of the inner first insertion part 31, and the inner second joining end part 35 that extends in the circumferential direction from the other end of the inner second insertion part 32. The inner second insertion part 32 is located away from the inner first insertion part 31 in the circumferential direction. In the present embodiment, the inner second insertion part 32 is inserted in the slot 12, which is six slots away from the slot 12 in which the inner first insertion part 31 is inserted.

The inner U-shaped part 33 is located on one side of the stator core 11 in the axial direction, and the inner first joining end part 34 and the inner second joining end part 35 are located on the other side of the stator core 11 in the axial direction. The inner first joining end part 34 and the inner second joining end part 35 are crooked to approach each other. In the present embodiment, the inner first joining end part 34 is joined to the outer first joining end part 24 of the outer U-shaped conductor 20 at a position corresponding to the slot 12 which is three slots 12 away from the slot 12 in which the inner first insertion part 31 is inserted. The inner second joining end part 35 is joined to the outer second joining end part 25 of the outer U-shaped conductor 20 at a position corresponding to the slot 12 which is three slots 12 away from the slot 12 in which the inner second insertion part 32 is inserted.

Figure 5:
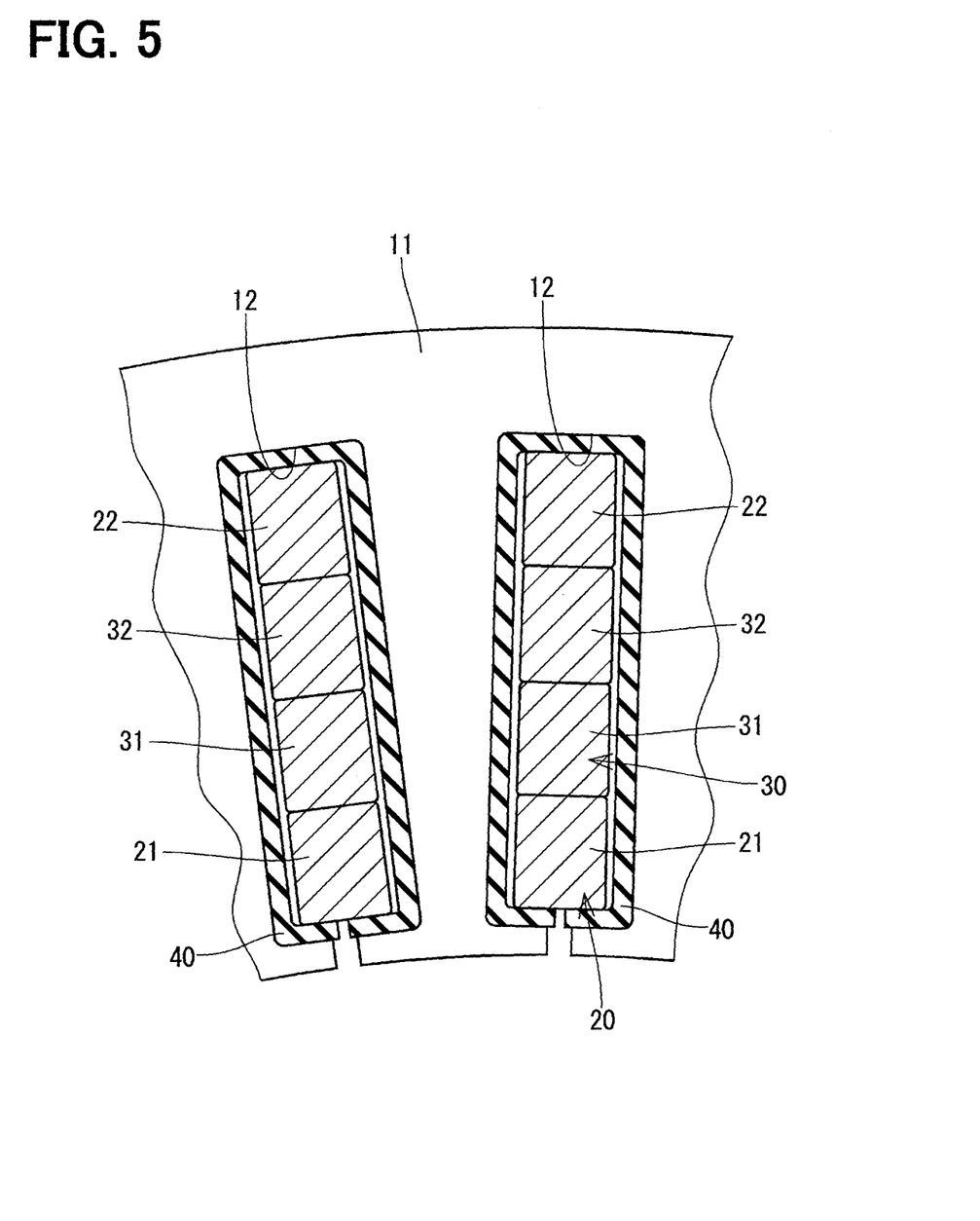
FIG. 5 is a diagram illustrating arrangement of conductors in slots of the iron core of the stator in FIG. 1.

As illustrated in FIG. 5, the outer first and second insertion parts 21, 22 and inner first and second insertion parts 31, 32 are arranged side by side in the radial direction and inserted in the slot 12 in a state where they are wrapped with an insulating paper 40. The outer first insertion part 21 of the outer U-shaped conductor 20 is inserted in the first layer of the slot 12 located on the innermost side in the radial direction. The inner first insertion part 31 of the inner U-shaped conductor 30 is inserted in the second layer of the slot 12 located on the second innermost side in the radial direction. The inner second insertion part 32 of the inner U-shaped conductor 30 is inserted in the third layer of the slot 12 located on the third innermost side in the radial direction. The outer second insertion part 22 of the outer U-shaped conductor 20 is inserted in the fourth layer of the slot 12 located on the outermost side in the radial direction.

Figure 6:
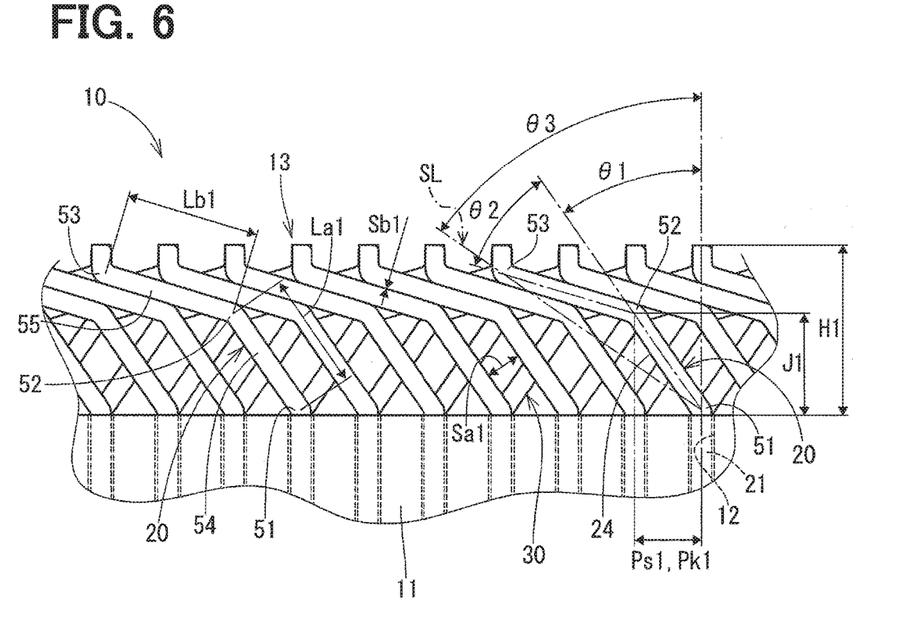
FIG. 6 is a diagram illustrating a joining end part of a U-shaped conductor of the stator in FIG. 1 viewed from a radially inward side.

A characteristic configuration of the stator winding 13 will be described in reference to FIGS. 2 and 6. In FIG. 6, an illustration of the insulating paper 40 is omitted. In the following description, the outer U-shaped conductor 20 and the inner U-shaped conductor 30 will be described as a "U-shaped conductor" when not distinguished from each other. The outer first joining end part 24 and the outer second joining end part 25 of the outer U-shaped conductor 20, and the inner first joining end part 34 and the inner second joining end part 35 of the inner U-shaped conductor 30 will be hereinafter described as a "joining end part" when they are not distinguished from each other. The outer first insertion part 21 and the outer second insertion part 22 of the outer U-shaped conductor 20, and the inner first insertion part 31 and the inner second insertion part 32 of the inner U-shaped conductor 30 will be hereinafter described as an "insertion part" when they are not distinguished from each other.

Bent parts will be described below. As illustrated in FIG. 6, the joining end part of the U-shaped conductor is bent near an opening of the slot 12, bent at a position of its joining to another U-shaped conductor, and bent between the bent position near the opening and the joining position. Accordingly, the joining end part of the U-shaped conductor includes a first bent part 51, a second bent part 52, and a third bent part 53 in this order from the slot 12-side. In the present embodiment, the joining end part includes one bent part (second bent part 52) between the first bent part 51 and the third bent part 53.

Bending angles will be described below. A part of the joining end part of the U-shaped conductor from the first bent part 51 to the second bent part 52 is referred to as a first slope part 54, and a part of the joining end part of the U-shaped conductor from the second bent part 52 to the third bent part 53 is referred to as a second slope part 55. A relationship expressed by the following inequality (1) holds given that an angle between the insertion part and the first slope part 54 of the U-shaped conductor is referred to as a first angle θ1, and that an angle between the first slope part 54 and the second slope part 55 is referred to as a second angle θ2.

$$\theta 2 \geq \theta 1 \quad (1)$$

In the present embodiment, the second angle θ2 is set at 40 degrees which is the same as the first angle θ1.

A relationship between the bent positions will be described below. A relationship expressed by the following inequality (2) holds given that an imaginary straight line connecting together the first bent part 51 and the third bent part 53 is referred to as an imaginary straight line SL, and that an angle between the insertion part of the U-shaped conductor and the imaginary straight line SL is referred to as a third angle θ3.

$$\theta 1 < \theta 3 \quad (2)$$

Axial length of the second bent part will be described below. A relationship expressed by the following inequality (3) holds given that the entire axial length of the joining end part of the U-shaped conductor is referred to as an entire axial length H, and that an axial length of a part of the joining end part from the stator core 11 to the second bent part 52 is referred to as an axial length J.

$$J < (2/3)H \quad (3)$$

In the present embodiment, an axial length J1 is set to be approximately 0.6 times longer than an entire axial length H1.

A distance between the bent parts will be described below. A circumferential distance between the two slots 12 which are adjacent in the circumferential direction is referred to as a slot distance Ps, and a circumferential distance between the first bent part 51 and the second bent part 52 is referred to as a bend distance Pk. In the present embodiment, the bend distance Pk1 is set to be the same as the slot distance Ps1.

Length of the slope part will be described below. A length of the first slope part 54 is referred to as a first length La, and a length of the second slope part 55 is referred to as a second length Lb. In the present embodiment, a second length Lb1 is set to be the same as a first length La1.

A clearance between the adjacent two slope parts will be described below. A relationship expressed by the following inequality (4) holds given that a clearance between the adjacent two first slope parts 54 is referred to as a first clearance Sa, and that a clearance between the adjacent two second slope parts 55 is referred to as a second clearance Sb.

$$Sa > Sb \quad (4)$$

In the present embodiment, a second clearance Sb1 is set at approximately 0 (zero), and a first clearance Sa1 is set to be larger than the second clearance Sb1.

A relationship between an inner diameter of the stator core and the number of slots will be described below. As illustrated in FIG. 2, a relationship between an inner diameter D [mm] of the stator core 11 and the number N of slots 12 satisfies a relationship expressed by the following inequality (5). In the present embodiment, the inner diameter D is 56 mm, and the number N of slots 12 is 60.

$$N > D \quad (5)$$

As described above, in the first embodiment, the outer and inner first joining end parts 24, 34 and the outer and inner second joining end parts 25, 35 of the U-shaped conductors 20, 30 that constitute the stator winding 13 respectively include the second bent part 52 between the first bent part 51 and the third bent part 53, the outer and inner first joining end parts 24, 34 and the outer and inner second joining end parts 25, 35 extending outward from the slot 12. Accordingly, by making the bending angle of the first bent part 51 near the opening of the slot 12 similar to the conventional art, the press of the U-shaped conductors 20, 30 against the slot edge of the stator core 11 is avoided, and the position of their joining to another U-shaped conductor can be located close to the stator core 11-side by the second bent part 52. As a result, in the stator 10 of the present embodiment, an axial length (entire axial length H1) of the coil end can be made short without damaging coating films of the U-shaped conductors 20, 30 and the insulating paper 40.

In the first embodiment, the second angle θ2 is set at the first angle θ1 or larger. Furthermore, in the first embodiment, the axial length J1 is set to be about 0.6 times as long as the entire axial length H1. In addition, in the first embodiment, the second clearance Sb1 is set to be smaller than the first clearance Sa1. Accordingly, the axial length of the coil end can more effectively be made short.

Second Embodiment

Figure 7:
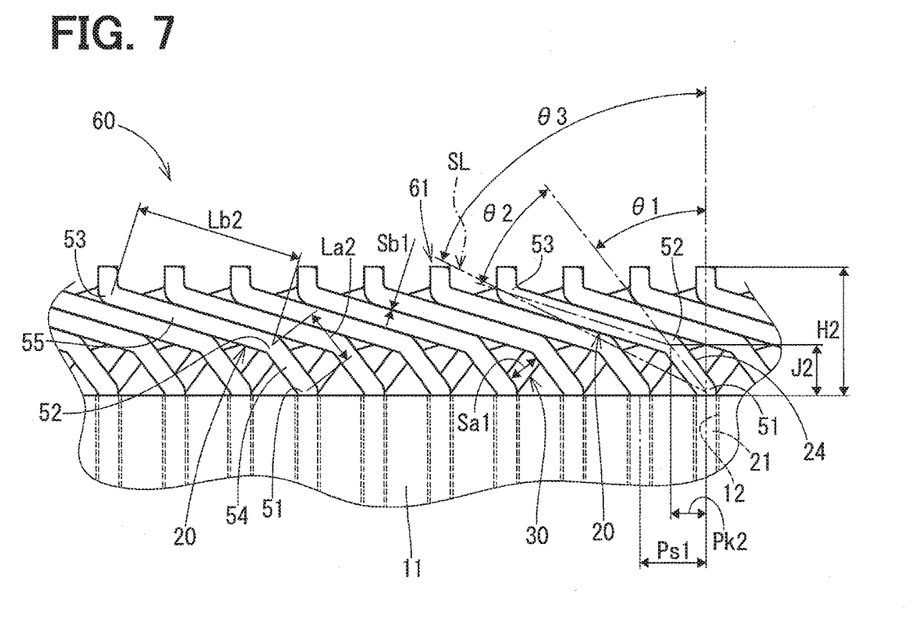
FIG. 7 is a diagram illustrating a joining end part side of a U-shaped conductor in a stator viewed from a radially inward side in accordance with a second embodiment.

A stator winding 61 of a stator 60 of a second embodiment will be described with reference to FIG. 7. An axial length of a second bent part will be described below. An entire axial length H and an axial length J are set to satisfy the relationship expressed by the above inequality (3). In the present embodiment, an axial length J2 is set to be approximately 0.4 times longer than an entire axial length H2.

A distance between the bent parts will be described below. A bend distance Pk and a slot distance Ps are set to satisfy a relationship expressed by the following inequality (6).

$$Pk<Ps \qquad (6)$$

In the present embodiment, a bend distance Pk2 is set to be approximately half as long as the slot distance Ps1.

Length of a slope part will be described below. A first length La and a second length Lb are set to satisfy a relationship expressed by the following inequality (7).

$$Lb>La \qquad (7)$$

In the present embodiment, a second length Lb2 is set to be approximately three times as long as a first length La2.

As described above, in the second embodiment, the axial length J2 is set to be approximately 0.4 times as long as the entire axial length H2. A second angle θ2 is set at 40 degrees which is the same as a first angle θ1. In addition, the bend distance Pk2 is set to be approximately half as long as the slot distance Ps1, and the second length Lb2 is set to be approximately three times as long as the first length La2. Accordingly, the axial length (entire axial length H2) of the coil end can be made short compared with the first embodiment.

Third Embodiment

Figure 8:
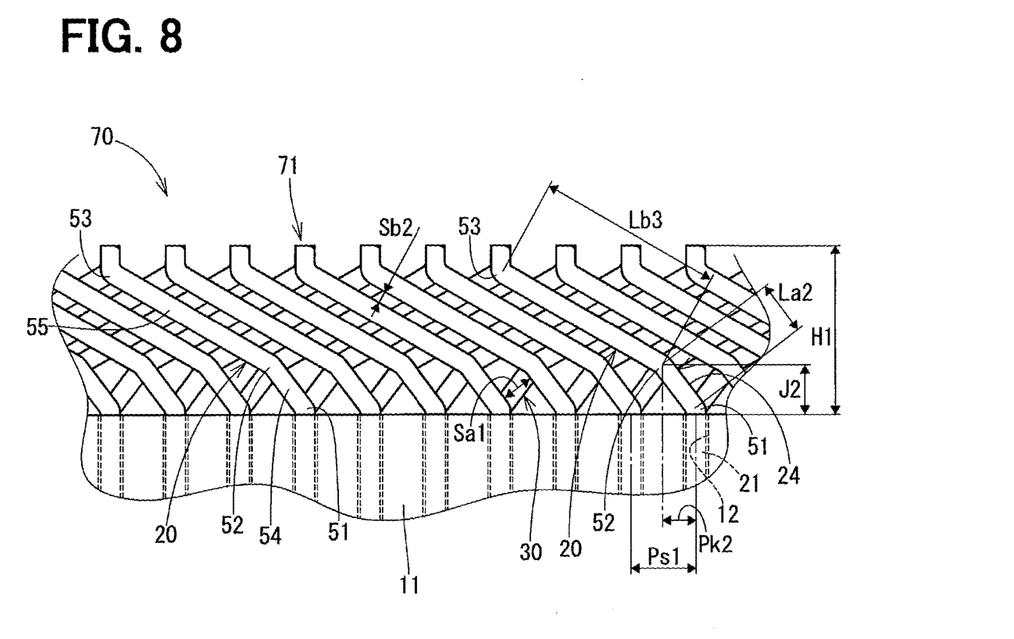
FIG. 8 is a diagram illustrating a joining end part side of a U-shaped conductor in a stator viewed from a radially inward side in accordance with a third embodiment.

A stator winding 71 of a stator 70 of a third embodiment will be described in reference to FIG. 8. In the third embodiment, an entire axial length H1 is the same as the first embodiment, and an axial length J2 is set to be approximately 0.3 times longer than the entire axial length H1. Similar to the second embodiment, a bend distance Pk2 is set to be approximately half as long as a slot distance Ps1, and a second length Lb2 is set to be approximately three times as long as a first length La2.

Accordingly, in the third embodiment, a second clearance Sb2 can be made larger than a second clearance Sb1 of the first embodiment. As a result, a gap along a surface for insulation of U-shaped conductors 20, 30 can be ensured, and the third embodiment can also meet high-voltage specifications. In addition, bending operations become easy because of the increase of the second clearance Sb2. An effect of such facilitation of the bending operations can be produced particularly in the stator in which the number N of slots 12 is large relative to an inner diameter D [mm] of a stator core 11 such that the relationship expressed by the above inequality (5) is satisfied.

Modifications to the above embodiments will be described. In a modification, the first joining end part and the second joining end part may include two or more second bent parts between the first bent part and the position of their joining to another U-shaped conductor. In a modification, the second angle θ2 may be smaller than the first angle θ1. In a modification, the axial length J may be more than (2/3) times longer than the entire axial length H.

In a modification, the bend distance Pk may be the slot distance Ps or longer. In a modification, the second length may be the first length La or shorter. In a modification, the relationship between the inner diameter D [mm] of the stator core and the number N of slots may satisfy an inequality N<D.

In a modification, a delta connection may be made between the winding wires. In a modification, there may be provided three or more winding wire parts constituting the winding wire, and the connections of the winding wire parts may be arbitrarily combined, i.e., the connection of the winding wire parts may be a series connection, a parallel connection, or a compound connection of series and parallel connections. In a modification, six or more conductors (insertion parts) may be inserted in one slot of the stator core.

In a modification, the combination between the pole number of the rotator and the number of slots of the stator core may be not only 10 poles and 60 slots but also another combination such as 20 poles and 120 slots. In a modification, the motor may be applied not only to the power source of the electric power steering for a vehicle but also to an electric motor or a generator for many purposes. The present disclosure is not limited to the above-described embodiments, and can be embodied in various modes without departing from the scope of the disclosure.

To sum up, the stator 10, 60, 70 for the rotational electrical machine 90 in the above embodiments can be described as follows.

A stator for a rotational electrical machine 90 includes a stator core 11 and a stator winding 13. The stator core 11 is formed in a cylindrical shape and includes a plurality of slots 12 arranged at intervals in a circumferential direction of the stator core 11. The plurality of slots 12 pass through the stator core 11 in an axial direction of the stator core 11. The stator winding 13 is obtained by joining together ends of a plurality of U-shaped conductors 20, 30 inserted through the plurality of slots 12. Each of the plurality of U-shaped conductors 20, 30 includes outer and inner first insertion parts 21, 31, outer and inner second insertion parts 22, 32, outer and inner U-shaped parts 23, 33, outer and inner first joining end parts 24, 34, and outer and inner second joining end parts 25, 35. The outer and inner first insertion parts 21, 31 is inserted in a corresponding one of the plurality of slots 12. The outer and inner second insertion parts 22, 32 is located away from the outer and inner first insertion parts 21, 31 in the circumferential direction and is inserted in a corresponding one of the plurality of slots 12. The outer and inner U-shaped parts 23, 33 connects together one end of the outer and inner first insertion parts 21, 31 and one end of the outer and inner second insertion parts 22, 32 on one side of the stator core 11 in the axial direction. The outer and inner first joining end parts 24, 34 extends out of the other end of the outer and inner first insertion parts 21, 31 on the other side of the stator core 11 in the axial direction, and is joined to another U-shaped conductor 30, 20 at a joining position 53 away from the outer and inner first insertion parts 21, 31 in the circumferential direction. The outer and inner second joining end parts 25, 35 extends out of the other end of the outer and inner second insertion parts 22, 32 on the other side of the stator core 11 in the axial direction, and is joined to another U-shaped conductor 30, 20 at a joining position 53 away from the outer and inner second insertion parts 22, 32 in the circumferential direction. The outer and inner first joining end parts 24, 34 and the outer and inner second joining end parts 25, 35 of the U-shaped conductors 20, 30 extend out of the slots 12. The outer and inner first joining end parts 24, 34 and the outer and inner first joining end parts 25, 35 respectively include a first bent part 51 and at least one second bent part 52. The first bent part 51 is bent near an opening of a corresponding one of the plurality of slots 12. The at least one second bent part 52 is bent between the first bent part 51 and the joining position 53.

As a result of such a configuration, by making the bending angle of the first bent part 51 near the opening of the slot 12 similar to the conventional art, the press of the U-shaped conductors 20, 30 against the slot edge of the stator core 11 is avoided, and the position 53 of their joining to another U-shaped conductor 20, 30 can be located close to the stator core 11-side by the second bent part 52. As a result, the axial length of the coil end can be made short without damaging the coating films of the U-shaped conductors 20, 30 and the insulating member 40.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A stator for a rotational electrical machine, comprising: a stator core that is formed in a cylindrical shape and includes a plurality of slots arranged at intervals in a circumferential direction of the stator core, the plurality of slots passing through the stator core in an axial direction of the stator core; and a stator winding that is obtained by joining together ends of a plurality or U-shaped conductors inserted through the plurality of slots, wherein: each of the plurality of U-shaped conductors includes: a first insertion part that is inserted in a corresponding one of the plurality of slots; a second insertion part that is located away from the first insertion part in the circumferential direction and is inserted in a corresponding one of the plurality of slots; a U-shaped part that connects together one end of the first insertion part and one end of the second insertion part on one side of the stator core in the axial direction; a first joining end part that extends out of the other end of the first insertion part on the other side of the stator core in the axial direction and that is joined to another U-shaped conductor at a joining position away from the first insertion part in the circumferential direction; and a second joining end part that extends out of the other end of the second insertion part on the other side of the stator core in the axial direction and that is joined to another U-shaped conductor at a joining position away from the second insertion part in the circumferential direction; the first joining end part and the second joining end part respectively include: a first bent part that is bent near an opening of a corresponding one of the plurality of slots; and at least one second bent part that is bent between the first bent part and the joining position, the at least one second bent part includes one second bent part; the one second bent part is bent toward the stator core; the first joining end part and the second joining end part respectively include: a first slope part between the first bent part and the one second bent part, a second slope part between the one second bent part and the joining position; a relationship expressed by $\theta 2 \geq \theta 1$ is satisfied given that: $\theta 1$ is a first angle made between an extending direction of the first insertion part and an extending direction of the first slope part and made between an extending direction of the second insertion part and the extending direction of the first slope part, and $\theta 2$ is a second angle made between the extending direction of the first slope part and an extending direction of the second slope part; and a relationship expressed by Pk<Ps is satisfied given that: Ps is a slot distance between an adjacent two of the plurality of slots in the circumferential direction, and Pk is a bend distance between the first bent part and the one second bent part in the circumferential direction.

2. The stator according to claim 1, wherein a relationship expressed by $\theta 1 < \theta 3$ is satisfied given that:
   an imaginary straight line connecting together the first bent part and the joining position is an imaginary straight line; and
   $\theta 3$ is a third angle made respectively between the first insertion part and the second insertion part, and the imaginary straight line.

3. The stator according to claim 1, wherein a relationship expressed by J<(2/3) H is satisfied given that:
   H is an entire axial length of each of the first joining end part and the second joining end part; and
   J is an axial length of each of the first joining end part and the second joining end part between the stator core and the one second bent part.

4. The stator according to claim 1, wherein a relationship expressed by Lb>La is satisfied given that:
   La is a first length of the first slope part; and
   Lb is a second length of the second slope part.

5. The stator according to claim 1, wherein:
   the first slope part is one of adjacent two of a plurality of first slope parts;
   the second slope part is one of adjacent two of a plurality of second slope parts; and
   a relationship expressed by Sa>Sb is satisfied given that:
     Sa is a size of a first clearance between the adjacent two of the plurality of first slope parts; and
     Sb is a size of a second clearance between the adjacent two of the plurality of second slope parts.

6. The stator according to claim 1, wherein a relationship expressed by N>D is satisfied given that:
   D [mm] is an inner diameter of the stator core; and
   N is a number of the plurality of slots.

7. The stator according to claim 1, wherein each of the plurality of U-shaped conductors includes:
   a first U-shaped conductor that is bent such that the first joining end part and the second joining end part separate away from each other in the circumferential direction; and
   a second U-shaped conductor that is bent such that the first joining end part and the second joining end part approach each other in the circumferential direction.

8. The stator according to claim 7, wherein the second U-shaped conductor is located inward of the first U-shaped conductor.

* * * * *